United States Patent [19]

Akashi

[11] Patent Number: 5,241,442
[45] Date of Patent: Aug. 31, 1993

[54] ALIGNMENT DISK

[75] Inventor: Sumio Akashi, Fujinomiya, Japan

[73] Assignee: Kabushiki Kaisha Toshiba, Kawasaki, Japan

[21] Appl. No.: 980,448

[22] Filed: Nov. 23, 1992

Related U.S. Application Data

[63] Continuation of Ser. No. 601,006, Oct. 22, 1990, abandoned, which is a continuation of Ser. No. 254,723, Oct. 7, 1988, abandoned.

[30] Foreign Application Priority Data

Oct. 23, 1987 [JP] Japan .................. 62-267905

[51] Int. Cl.$^5$ .................. G11B 5/82; G11B 5/02
[52] U.S. Cl. .................. 360/135; 360/128; 360/21; 360/76; 360/77.06
[58] Field of Search .................. 360/76, 77.01, 77.05, 360/77.06, 77.07, 128, 135, 31, 21, 77.08

[56] References Cited

U.S. PATENT DOCUMENTS

| | | |
|---|---|---|
| 2,938,962 | 5/1960 | Konins et al. .................. 360/76 |
| 3,185,972 | 5/1965 | Sippel .................. 360/109 |
| 3,665,118 | 5/1972 | Cooper, Jr. .................. 360/21 |
| 4,314,290 | 2/1982 | Ragle .................. 360/21 X |
| 4,608,618 | 8/1986 | Sturtevant-Stuart .................. 360/135 |

OTHER PUBLICATIONS

IBM Technical Disclosure Bulletin vol. 20 No. 5 Oct. 1977 Read/Write Magnetic Azimuth Adjustment Method, Hart et al.

A preprint of 1986 National Meeting of Electronics and communications Engineers of Japan, p. 7—This document shows a specification on an alignment disc for a high-density floppy disc apparatus. An explanation is given of a di-bit system underlying this invention, but the contents per se of the invention are never disclosed there.

An English translation of preprint of 1986 National Meeting of Electronics and communications Engineers of Japan, Fujiki et al.

*Primary Examiner*—Andrew L. Sniezek
*Attorney, Agent, or Firm*—Cushman, Darby & Cushman

[57] ABSTRACT

In the present alignment disk for adjusting the tracking and azimuth of a magnetic head, a track includes adjacent first and second regions which are circular and substantially concentric. First data and second data are recorded on the first region of the track at first and second angles with respect to a width direction of the track, respectively. Third and fourth data are recorded on the second region at third and fourth angles with respect to the width direction, respectively. The tracking and azimuth are adjusted on the basis of the voltage level relation between the output signals, which correspond to the first and third data and the first and second data readout by a magnetic head.

9 Claims, 4 Drawing Sheets

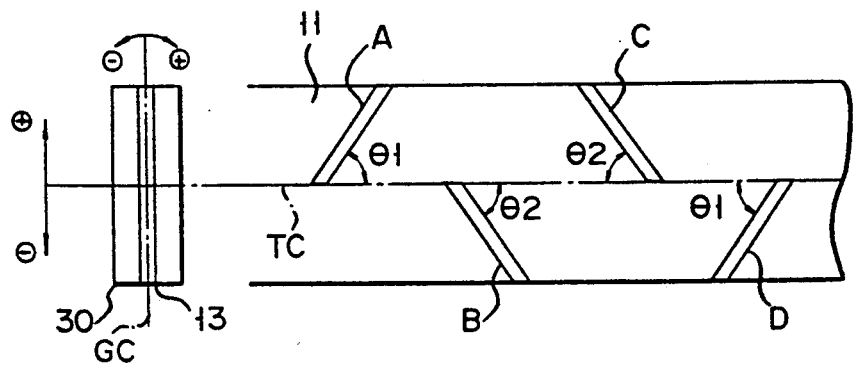
FIG. 4
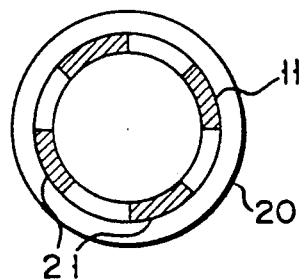
FIG. 5
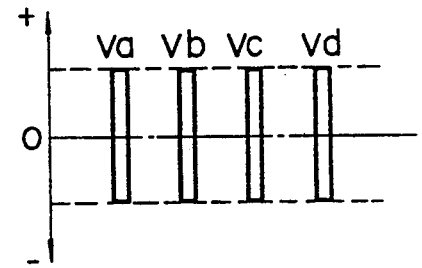
FIG. 8A
| CONDITION | | |
|---|---|---|
| Va>Vd | Vb<Vc | TRACK+ |
| Va=Vd | Vb=Vc | OK |
| Va<Vd | Vb>Vc | TRACK- |
| Va<Vc | Vb>Vd | AZIMUTH- |
| Va=Vc | Vb=Vd | OK |
| Va>Vc | Vb<Vd | AZIMUTH+ |
FIG. 9
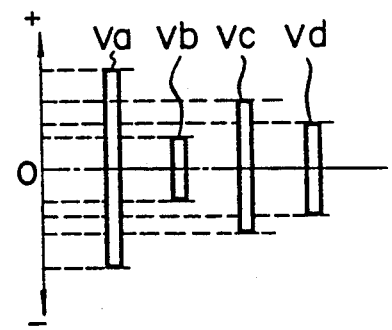
FIG. 8B

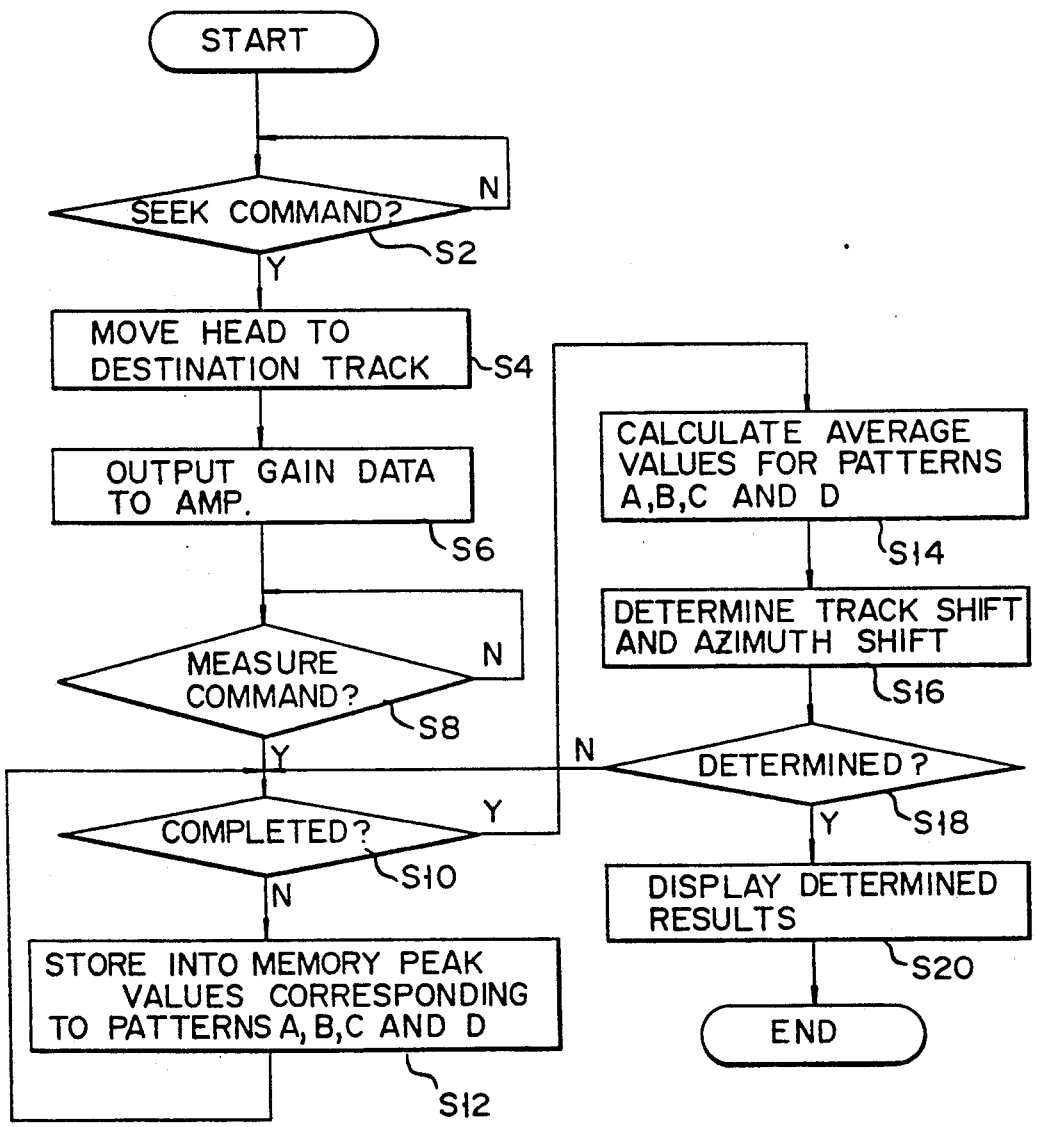
F I G. 7

ALIGNMENT DISK

This is a continuation of application Ser. No. 07/601,006, filed on Oct. 22, 1990, which was abandoned upon the filing hereof which is a continuation of application Ser. No. 07/254,723, filed Oct. 7, 1988, which was abandoned.

BACKGROUND OF THE INVENTION

1. Field of the Invention

The present invention relates to an alignment disk for use in adjusting the tracking and azimuth of a magnetic head of, for example, a floppy disk drive.

2. Description of the Related Art

A magnetic head of a floppy disk drive needs the proper tracking and azimuth adjustments with respect to a track on a recording medium. In a double-sided type floppy disk drive, the adjustments should be executed with respect to each magnetic head of sides 0 and 1. Without such adjustments, disk compatibility would be lost.

An alignment disk of a dibit pattern system is typically used for the tracking and azimuth adjustments. This alignment disk has adjustment data recorded thereon, which consists of dibit patterns of tracking patterns e to h and azimuth patterns I to L, as shown in FIG. 1. As shown in FIG. 2, patterns e-h and I-L alternately recorded on predetermined track 11' of alignment disk 10. Such alignment disk 10 is set in a floppy disk drive having a magnetic head which is the object for the adjustments and is accessed there. The object magnetic head reproduces an output signal corresponding to the adjustment data from disk 10. Based on the voltage level of the reproduced output signal, the tracking and azimuth of the object magnetic head are adjusted.

As shown in FIG. 1, when magnetic head 12 is positioned on the track center TC of track 11', and when it has no azimuth shift between the center line GC of its gap 13 and a line orthogonal to the track center TC, output signals Ve to Vh are reproduced from tracking patterns e-h of alignment disk 10 and output signals $V_I$ to $V_L$ are reproduced from azimuth patterns I-L. These signals would have waveforms be as shown in FIG. 3A. In this case, since the center of the width of gap 13 coincides with track center TC, the individual signals Ve-Vh have the same voltage level. In addition, since there is no azimuth shift of center line GC of gap 13 of head 12, the individual signals $V_I$-$V_L$ also have the same voltage level. If magnetic head 12 is shifted in the "+" direction with respect to track center TC, the output signals reproduced from tracking patterns e-h would have the voltage levels, Ve>Vf and Vg>Vh, as shown in FIG. 3 B. If magnetic head 12 is inclined in the "+" direction with respect to the orthogonal line to the track center TC, the output signals reproduced from azimuth patterns I-L would have the voltage levels, $V_I > V_J$ and $V_K > V_L$, as shown also in FIG. 3B. FIGS. 3A and 3B actually illustrate the conceptual waveforms that represent changes in voltage level of these output signals. Based on such output signals reproduced from magnetic head 12, the tracking and azimuth of head 12 are adjusted.

With the use of the aforementioned alignment disk 10, however, it is necessary to alternately record, on a predetermined track, plural types of dibit patterns serving as the tracking and azimuth patterns. This complicates the process for recording the adjustment data on alignment disk 10 and requires a significant amount of time for the job.

SUMMARY OF THE INVENTION

Accordingly, it is an object of this invention to provide an alignment disk which can ensure the proper tracking and azimuth adjustment of a magnetic head with a simple dibit pattern structure, and can simplify the process for recording adjustment data and can shorten the time required for the process.

In the present alignment disk for adjusting the tracking and azimuth of a magnetic head, a track includes adjacent first and second regions which are circular and substantially concentric. First data and second data are recorded on the first region of the track at first and second angles with respect to a width direction of the track, respectively. Third and fourth data are recorded on the second region at third and fourth angles with respect to the width direction, respectively.

With the use of the present alignment disk with the above simple dibit pattern structure, it is possible to surely execute the tracking and azimuth adjustments of a head. Further, since the adjustment data has a simple dibit pattern structure, the process for recording the data in production of the alignment disk can be simplified and the processing time can be shortened.

BRIEF DESCRIPTION OF THE DRAWINGS

FIG. 4 is a conceptual diagram illustrating the recorded state of adjustment data of an alignment disk according to one embodiment of this invention;

FIG. 5 is a conceptual diagram illustrating the structure of the alignment disk;

FIG. 7 is a flowchart for explaining the operation of the adjustment device;

FIGS. 8A and 8B are conceptual waveform diagrams for explaining the operation of the embodiment; and FIG. 9 is a diagram illustrating a table used for discrimination of tracking and azimuth shifts.

DETAILED DESCRIPTION OF THE PREFERRED EMBODIMENT

Figure 1:
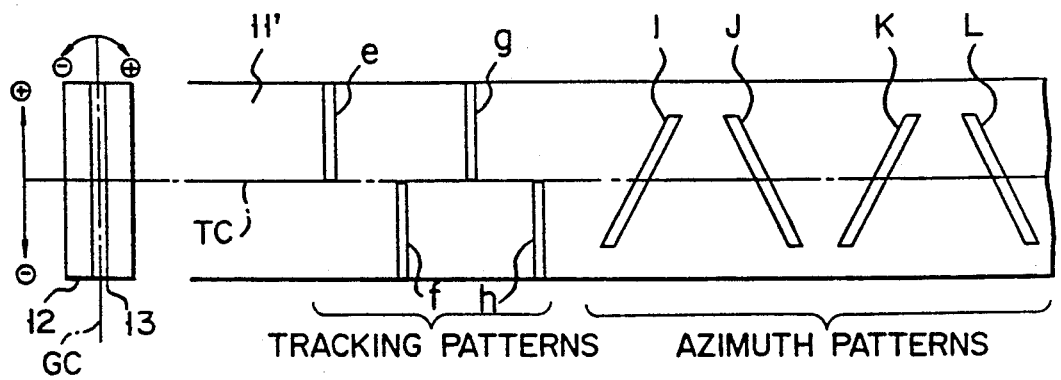
FIG. 1 is a conceptual diagram illustrating adjustment data of a prior art alignment disk.
Figure 2:
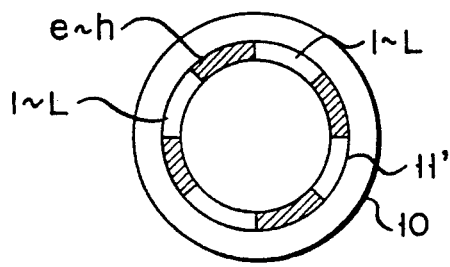
FIG. 2 is a conceptual diagram illustrating the structure of the prior art alignment disk.
Figure 3A:
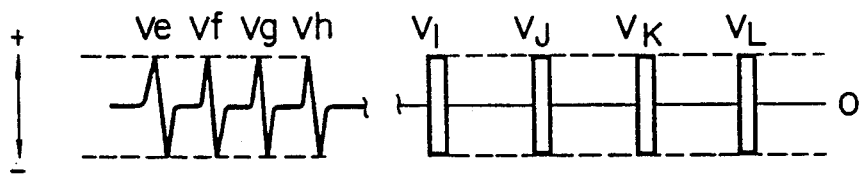
FIGS. 3A and 3B are conceptual waveform diagrams for explaining the tracking and azimuth adjustments according to the prior art.
Figure 3B:
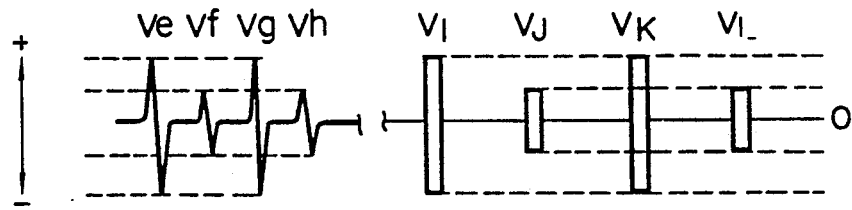

An alignment disk embodying this invention and an adjustment method using it will be described below with reference to the accompanying drawings.

First, referring to FIG. 4, a description will be given of the recorded state of dibit patterns which serves as adjustment data recorded on an alignment disk 20 of this invention. As shown in FIG. 4, on unit of the adjustment data is constituted by two pairs of dibit patterns. The first pair includes patterns A and D inclined in the "+" direction. The second pair includes patterns B and C inclined in the "−" direction. The pattern A has predetermined azimuth $(\pi/2 - \theta 1)$ with respect to a line orthogonal to track center TC of track 11 and the pattern D has the same azimuth as the pattern A. The patterns B and C have the same azimuth ($\theta 2 - \pi/2$). The angle $\theta 1$ may be the same as $\theta 2$, i.e., the absolute values of azimuths of patterns A and C or B and D may be the same value. The patterns A-D are arranged, separate from one another, in a predetermined order. Each pattern A, B, C or D, may contain one-bit data as well as data of a plurality of bits. The number of bits to be written should be selected in accordance with the recording density or the adjustment accuracy of a disk used in practice. Alignment disk 20 has plural units of dibit patterns 21 recorded on predetermined track 11, as shown in FIG. 5, with an unrecorded region provided between the units for the purpose of reducing the amount of data. Only one unit of dibit pattern 21 may be recorded on entire track 11.

Figure 6:
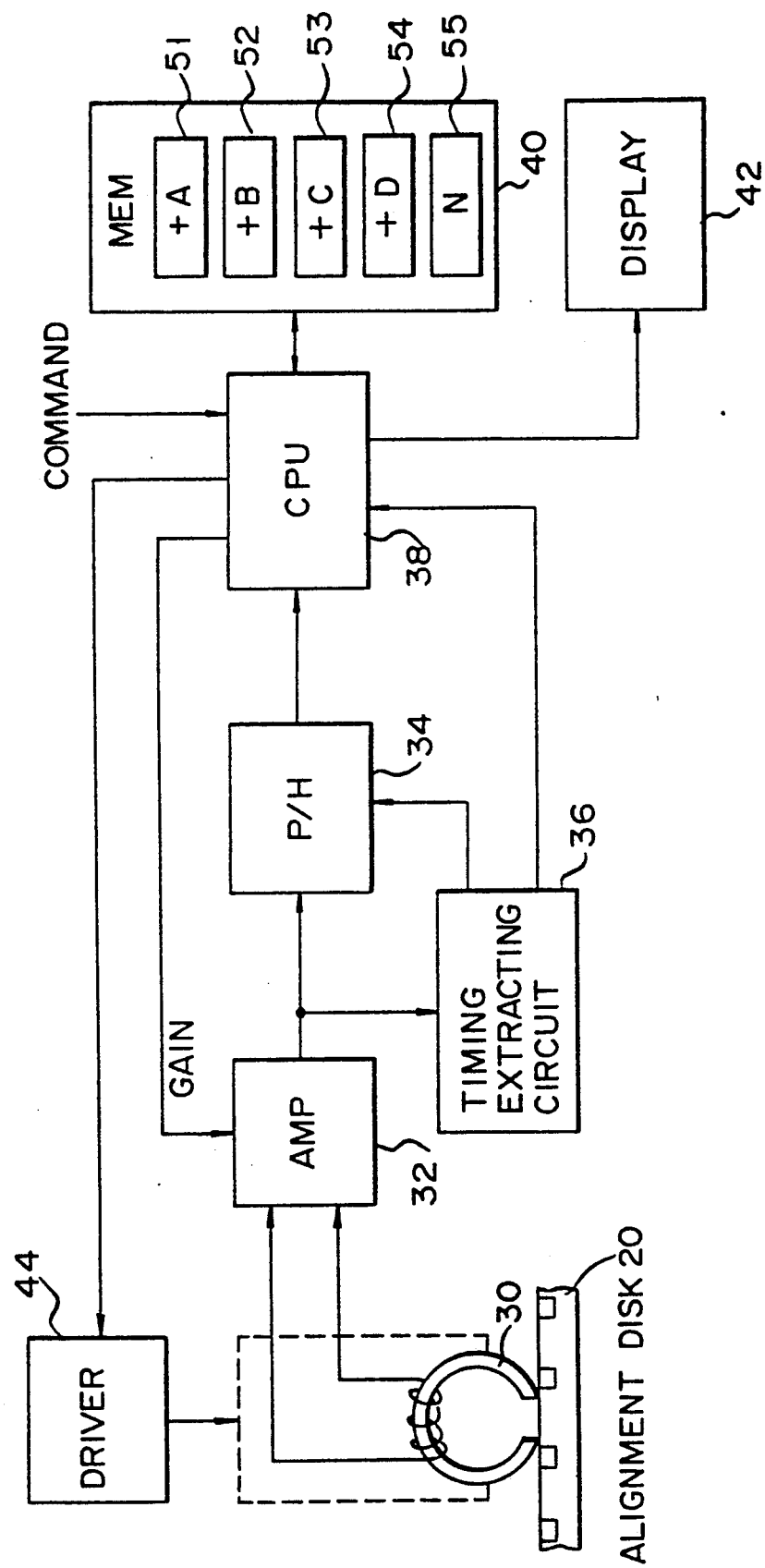
FIG. 6 is a block diagram illustrating the arrangement of an adjustment device according to this invention, which adjusts tracking and azimuth shifts using the alignment disk.

An adjustment device for effecting the tracking and azimuth adjustments is arranged as shown in FIG. 6. Driver 44 moves read/write head 30 to destination track 11 in accordance with a drive instruction from CPU 38. A signal reproduced by head 30 from the dibit patterns on alignment disk 20 is amplified by amplifier 3 whose gain is controlled by an instruction of CPU 38. The amplified signal is sent to peak hold (P/H) circuit 34 and timing extracting circuit 36. Timing extracting circuit 36 generates first and second timing signals corresponding to patterns A-D and sends the first timing signal to P/H circuit 34. In accordance with the first timing signal, P/H circuit 34 holds the peak value of the amplified signal from amplifier 32. The second timing signal is sent to CPU 38. In accordance with the second timing signal, the held peak value is latched in CPU 38, and is added to a value already stored in a predetermined register of memory (MEM) 40. This memory 40 has registers 51-55 corresponding to patterns A-D and the number of units N, and a table shown in FIG. 9. When tracking and azimuth shifts are finally determined, the results are displayed on display 42.

Referring now to FIG. 7, the operation of the adjustment device will be described.

First, in step S2, a seek command is entered in CPU 38. In step S4, CPU 38 sends the drive instruction to driver 44 so as to cause head 30 to seek destination track 11. At the same time, in step S6, CPU 38 outputs a gain for the destination track to amplifier 32.

Upon reception of a measure command (step S8), CPU checks in step S10 whether or not the measurement is completed. If the determination is negative (N), the flow advances to step 12 where the peak value corresponding to pattern A is held by P/H circuit 34 in accordance with the first timing signal from timing extracting circuit 36. The held peak value is latched in CPU 38 in response to the second timing signal. The latched peak value is added to the data that has already been stored in register 51 of memory 40, and the resultant data is stored in register 51. The peak values corresponding to the other patterns B, C and D are processed in the same manner. Upon completion of the signal processing with respect to patterns A through D, the value N of register 55 is incremented by one. In this manner, the processing is executed for at least one cycle of disk 20.

If it is determined in step S10 that the measurement has completed, average values are calculated in step S14. More specifically, the values stored in the individual registers 51-54 are divided by the value N stored in register 55, thereby providing the average values. Acquiring the average values can eliminate the adjustment error due to possible eccentricity of the disk. From the acquired average values, the tracking and azimuth shifts of head 30 are determined as follows referring to the table shown in FIG. 9.

When the center of the width of head 30 coincides with track center TC, and when the gap's center line GC is not inclined, as shown in FIG. 4, magnetic head 30 reproduces output signals Va-Vd of a predetermined voltage level, as shown in the conceptual waveform diagram in FIG. 8A that illustrates a change in voltage level. If magnetic head 30 has no tracking shift, the voltage levels Va and Vd or Vb and Vc of the reproduced signals would equal each other, and if no azimuth shift is present, the voltage levels Va and Vc or Vb and Vd of the reproduced signals would equal each other.

When magnetic head 30 is shifted in the "+" direction of the tracking with respect to track center TC (i.e., in the "+" tracking direction) and is shifted in the "+" direction of the azimuth with respect to a line orthogonal to track center TC (i.e., in the "+" azimuth direction), the signals reproduced by head 30 would have voltage levels Va-Vd as shown in FIG. 8B. With the tracking shift in the "+" direction, Va>Vd and Vb<Vc, and with the azimuth shift in the "+" direction, Va>Vc and Vb<Vd.

On the other hand, if magnetic head 30 is shifted in the "−" direction of the tracking with respect to track center TC (i.e., in the "−" tracking direction), Va<Vd and Vb>Vc. With the azimuth shift in the "−" direction, Va<Vc and Vb>Vd.

As described above, the tracking and azimuth shifts can be determined from the average values referring to the table shown in FIG. 9.

In step S18, it is checked whether or not the tracking and azimuth shifts are determined; if the determination is Y, step S20 is executed to display the determined results on display 42, and if it is N, the process following step S10 is executed to latch data again.

In the above manner, the tracking and azimuth of magnetic head 30 can be adjusted based on the voltage levels of the individual reproduced signals from head 30 which correspond to patterns A-D. Further, the adjustment data has a simple structure including at least two pairs of dibit patterns. Therefore, alignment disk 20 needs only to have such simple-structured adjustment data and thus does not require the conventional troublesome task of alternately recording plural pairs of dibit patterns. This results in simplification of the recording task as well as shortening of the time for the task.

According to the above embodiment, recording positions of the individual patterns A-D on track 11 of alignment disk 20 are not limited to those shown in FIG. 4. What is more, these patterns may be arranged in an arbitrary order. For instance, pattern D may be recorded at the proximity of pattern A.

Although the tracking and azimuth shifts are determined in accordance with the data stored in the memory in the above embodiment, the timing extracting circuit, peak hold circuit, memory and display can be eliminated if the magnetic head is adjusted while monitoring the voltage levels of the reproduced signals on, for example, a synchroscope.

What is claimed is:

1. An alignment disk for adjusting tracking and azimuth of a head, comprising:
   a track which is concentrically located on the disk and having first and second concentric regions on opposite sides of a track median;

a first elongated area of magnetization substantially entirely contained in the first region at an acute angle with respect to a line tangent to the track median at a point of closest approach to the first elongated area;

a second elongated area of magnetization substantially entirely contained in the first region at an obtuse angle with respect to a line tangent to the track median at a point of closest approach to the second elongated area;

a third elongated area of magnetization substantially entirely contained in the second region at a third angle with respect to a line tangent to the track median at a point of closest approach to the third elongated area, said third angle substantially $\pi$ radians greater than the obtuse angle; and a fourth elongated area of magnetization substantially entirely contained in the second region at a fourth angle with respect to a line tangent to the track median at a point of closest approach to the fourth area, said fourth angle substantially $\pi$ radians greater than the acute angle;

wherein at least one of 1) said first and fourth elongated areas and 2) said second and third elongated areas are positioned to generate tracking adjustment signals, and at least one of 1) said first and second elongated areas and 2) said third and fourth elongated areas are positioned to generate azimuth adjustment signals.

2. An alignment disk according to claim 1, wherein said first region of said track has a width substantially equal to that of said second region.

3. An alignment disk according to claim 1, wherein said first to fourth elongated areas are positioned separately from one another in an arbitrary predetermined order.

4. An alignment disk according to claim 3, wherein a plurality of sets of said elongated areas are recorded around said track.

5. An alignment disk according to claim 1, wherein said first to fourth elongated areas each includes a plurality of bits.

6. An alignment disk according to claim 1, wherein the acute and obtuse angles are supplements of one another.

7. An alignment disk for indicating tracking and azimuth error of a head having a gap and a gap center line for which tracking error is defined in terms of radial displacement of the head and azimuth error is defined in terms of non-radial orientation of the gap center line, comprising:

a circular recording disk;

a concentrically located track on the disk to which signals may be recorded and from which the head may read recorded signals, the track having first and second annular regions on opposite sides of a track median;

a first area of magnetization A substantially entirely contained in the first annular region at a first azimuth error and positioned to be read by the head;

a second area of magnetization C substantially entirely contained in the first annular region at a second azimuth error substantially different from the first azimuth error and positioned to be read by the head; and a third area of magnetization D substantially entirely contained in the second annular region at an azimuth error substantially equal to the first azimuth error and positioned to be read by the head;

wherein the first area is positioned to generate a reference signal for indicating both head tracking and azimuth error, the second area is positioned to generate a first comparative signal for indicating head azimuth error when compared to the reference signal, and the third area is positioned to generate a second comparative signal for indicating head tracking error when compared to the reference signal.

8. An alignment disk as in claim 7 further comprising a fourth area of magnetization B substantially entirely contained in the second annular region at an azimuth error substantially equal to the second azimuth error and positioned to be read by the head;

wherein the fourth area is positioned to generate a comparative signal for one of 1) indicating head tracking error when compared to the second comparative signal and 2) indicating head azimuth error when compared to the third comparative signal.

9. A magnetic media disk for determining alignment errors of a magnetic head comprising:

at least one curvilinear track concentrically defined on a magnetic media and extending in a first circumferential direction around a central axis and in a second circumferential direction opposite to the first direction, the track including first and second recording regions on opposite sides of a track median;

first and second area pairs on the track, each area defined by at least a major axis and having one end proximate to the median and another end remote from the median;

the first pair including a first area of magnetization A substantially entirely contained in the first region and a second area of magnetization D substantially entirely contained in the second region, the first area A having its proximal end displaced toward the first direction relative to its remote end, the second area D displaced along the median from the first area A and having its proximal end displaced toward the second direction relative to its remote end; and the second pair including a first area of magnetization C substantially entirely contained in the first region and a second area of magnetization B substantially entirely contained in the second region, the first area C of the second pair having its proximal end displaced toward the second direction relative to its remote end, the second area of the second pair B displaced along the median from the first area of the second pair C and having its proximal end displaced toward the first direction relative to its remote end;

wherein at least one 1) the first and second areas of the first pair and 2) the first and second areas of the second pair are positioned to generate tracking adjustment signals, and at least one of 1) the first areas of the first and second pairs and 2) the second areas of the first and second pairs are positioned to generate azimuth adjustment signals.

* * * * *